United States Patent
Kasahara

(10) Patent No.: US 8,218,897 B2
(45) Date of Patent: Jul. 10, 2012

(54) IMAGE PROCESSING METHOD, IMAGE PROCESSING APPARATUS, AND IMAGING APPARATUS

(75) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 794 days.

(21) Appl. No.: 12/318,941

(22) Filed: Jan. 13, 2009

(65) Prior Publication Data

US 2009/0190855 A1    Jul. 30, 2009

(30) Foreign Application Priority Data

Jan. 28, 2008   (JP) ................. 2008-016364

(51) Int. Cl.
*G06K 9/40*   (2006.01)
(52) U.S. Cl. ...................................... 382/275
(58) Field of Classification Search .................. None
See application file for complete search history.

(56) References Cited

U.S. PATENT DOCUMENTS

2003/0031375 A1* 2/2003 Enomoto ................ 382/255
2004/0202380 A1  10/2004 Kohler et al.
2006/0274170 A1* 12/2006 Azuma .................. 348/246

FOREIGN PATENT DOCUMENTS

JP         07-037079      2/1995
JP         2006-345054   12/2006

OTHER PUBLICATIONS

Guo-Qing Wei and Song De Ma, "Implicit and Explicit Camera Calibration: Theory and Experiments", May 1994, IEEE Transactions on Pattern Analysis and Machine Intelligence, vol. 16, No. 5, pp. 469-480.*
European Office Action dated Aug. 20, 2009.
Wonpil Yu et al. "A calibration-free lens distortion correction method for low cost digital imaging." Proceedings 2003 International Conference on Image Processing, IEEE Piscataway, NJ, USA, vol. 1, 2003, pp. I-813 through I-816.
Christian Brauer-Burchardt et al. "A new algorithm to correct fish-eye- and strong wide-angle-lens distortion from single images." Proceedings 2001 International Conference on Image Processing. ICIP 2001. Thessaloniki, Greece, Oct. 7, 2001; [International Conference on Image Processing], New York, NY, vol. 1, pp. 225-228.
Hatanaka et al., "Development of In-Vehicle Image Processing Equipment", SEI Technical Review, vol. 162, pp. 90-93, Mar. 2003.
Japanese Office Action dated Nov. 8, 2011.

* cited by examiner

*Primary Examiner* — Claire X Wang
*Assistant Examiner* — Siamak Harandi
(74) *Attorney, Agent, or Firm* — Harness, Dickey & Pierce, P.L.C.

(57) ABSTRACT

A distortion included in image data is corrected by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

6 Claims, 8 Drawing Sheets

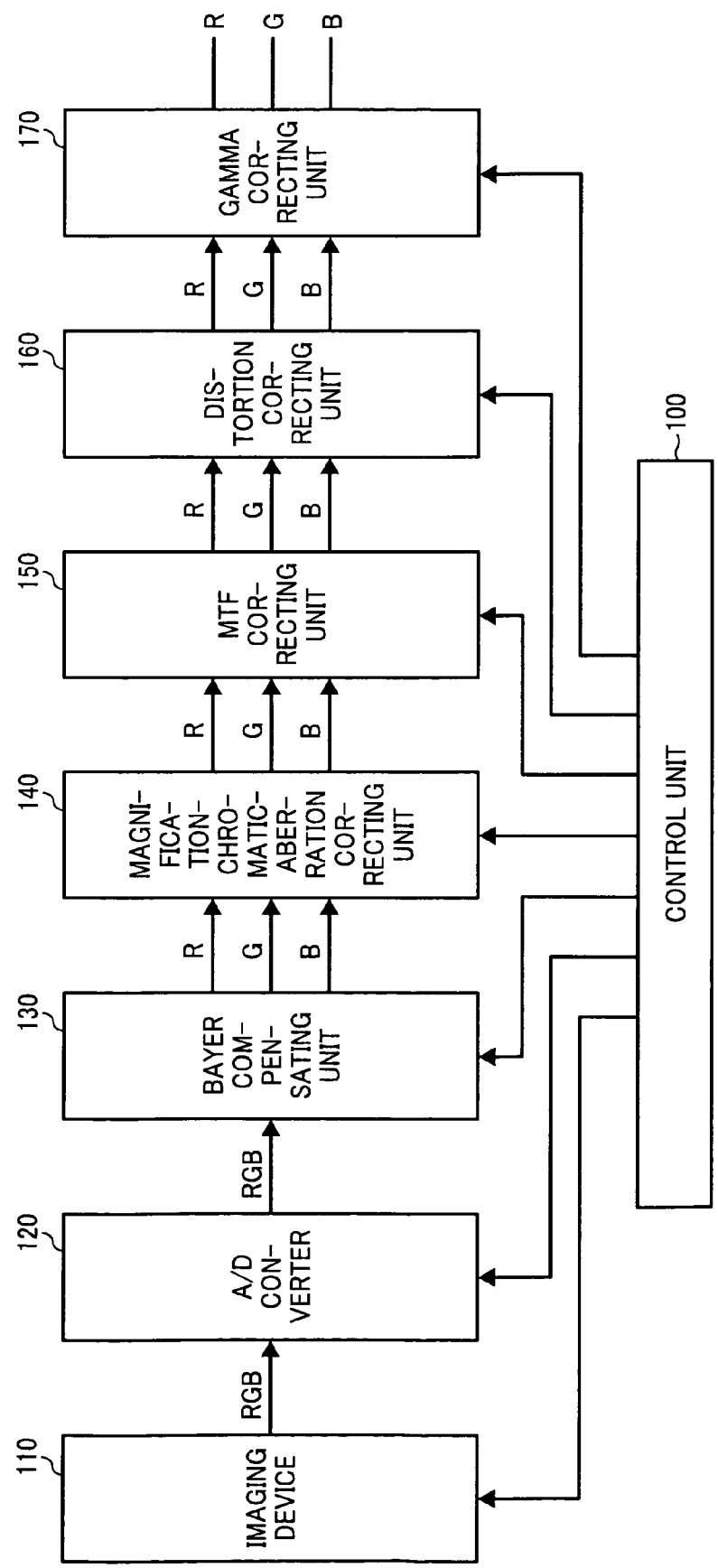

G-SIGNAL

R-SIGNAL

B-SIGNAL

| 0 | −0.5 | 0 | −0.5 | 0 |
| --- | --- | --- | --- | --- |
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

IMAGE PROCESSING METHOD, IMAGE PROCESSING APPARATUS, AND IMAGING APPARATUS

CROSS-REFERENCE TO RELATED APPLICATIONS

The present application claims priority to and incorporates by reference the entire contents of Japanese priority document 2008-016364 filed in Japan on Jan. 28, 2008.

BACKGROUND OF THE INVENTION

1. Field of the Invention

The present invention relates to a technology for processing an image captured by an optical system having a wide angle and a large distortion.

2. Description of the Related Art

Recently, demands for a wide-angle imaging apparatus are increasing for applications such as a back monitor of a vehicle. However, as the angle becomes wider, the chromatic aberration of magnification and distortion become large, making it difficult to design an optical system with a small aberration. Therefore, performance needs to be improved in combination with image processing.

In the imaging apparatus using the optical system having the chromatic aberration of magnification and the distortion, a conventional technique for correcting a distortion includes a method of correcting the chromatic aberration of magnification and the distortion at the same time by performing coordinate transformation independently for each color component of red (R), green (G), and blue (B) with respect to an R-signal, a G-signal, and a B-signal obtained by the imaging device such as a charge coupled device (CCD) or a complimentary metal oxide semiconductor (CMOS) sensor at a subsequent stage, as described in Japanese Patent Application Laid-open No. 2006-345054. Also, it is well known that a method of correcting only the distortion by performing coordinate transformation for respective color components of RGB together, ignoring the chromatic aberration of magnification. Further, a complicated polynomial or the like is generally used as the formula of coordinate transformation, for example, as described in Hatanaka, et al., "Development of In-Vehicle Image Processing Equipment", SEI Technical Review, Vol. 162, pp. 90-93, March 2003 [http://www.se-i.co.jp/tr/pdf/automotve/sei10357.pdf].

Although the magnification chromatic aberration is different for each color component, the distortion is uniform in respective color components of RGB. Further, the distortion is much larger than the magnification chromatic aberration. Therefore, it is desired to correct the magnification chromatic aberration and the distortion separately.

However, in correction of the distortion, coordinate transformation is conventionally performed in x and y directions, and a complicated polynomial or the like is generally used as the formula of coordinate transformation. Therefore, the circuit size increases, and there is a limitation in cost reduction. Particularly, in order to correct a fisheye image having a large distortion obtained by using the fisheye optical system to an image easily viewable to human eyes, a complicated polynomial is required, thereby causing an increase in the circuit size. The fisheye optical system refers to an optical system that executes projection methods such as stereographic projection $y=2f\tan(\theta/2)$, equidistant projection $y=f\theta$, equisolidangle projection $y=2f\sin(\theta/2)$, and orthogonal projection $y=f\sin\theta$ other than a projection method in a normal lens $y=f\tan\theta$, where an image height is y, a focal length is f, and a half view angle is $\theta$.

SUMMARY OF THE INVENTION

It is an object of the present invention to at least partially solve the problems in the conventional technology.

According to one aspect of the present invention, there is provided a method of processing image data including a distortion. The method includes correcting the distortion by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

Furthermore, according to another aspect of the present invention, there is provided an apparatus for processing image data including a distortion. The apparatus includes a distortion correcting unit that corrects the distortion by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

Moreover, according to still another aspect of the present invention, there is provided an imaging apparatus including an imaging device that captures an image using an optical system having a large distortion and outputs image data including the distortion and an image processing apparatus that processes the image data including. The image processing apparatus includes a distortion correcting unit that corrects the distortion by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an imaging apparatus according to an embodiment of the present invention;

DETAILED DESCRIPTION OF THE PREFERRED EMBODIMENTS

Figure 2A:
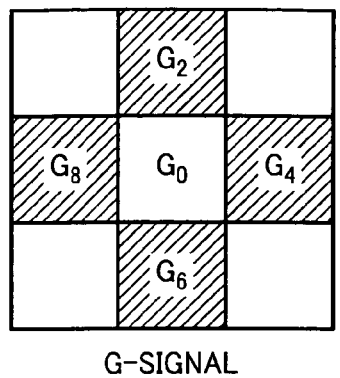
FIG. 2A is a schematic diagram of a Bayer color filter array for a G-signal.

Exemplary embodiments of the present invention will be explained below in detail with reference to the accompanying drawings. The embodiments explain an imaging apparatus that captures a subject by using an optical system having a large chromatic aberration of magnification and distortion with a wide angle, and an image processing system has a configuration to correct the chromatic aberration of magnification and distortion. However, the main characteristic of the present invention is the correction of the distortion, and the image needs to be an image captured by the optical system having at least wide angle and large distortion. While color components of the image are red (R), green (G), and blue (B) of an additive primary colors, they can be yellow (Y), magenta (M), and cyan (C) of a subtractive primary colors.

FIG. 1 is a functional block diagram of an image processing system in an imaging apparatus according to an embodiment of the present invention. In addition to the components shown in FIG. 1, the imaging apparatus according to the embodiment includes an operating unit, an image storage unit, and an image display unit, which are not shown in FIG. 1. The imaging apparatus is used as, for example, a vehicle on-board camera, but it is not the only application that limits the present invention.

As shown in FIG. 1, a control unit 100 provides required control signals (clock, horizontal/vertical synchronization signal, and the like) to respective units to control the operation of the units in a pipelined manner.

An imaging device 110 includes, for example, a CCD or CMOS sensor for converting an optical image captured using the optical system (not shown) such as a fisheye optical system having a wide angle and large chromatic aberration of magnification and distortion into an electric signal (pixel data). A Bayer color filter array is provided in the imaging device 110, and Bayer-arrayed RGB pixel data is sequentially output based on coordinate data (x, y) given from the control unit 100. The control unit 100 gives the coordinate data (x, y) given to the imaging device 110 to a subsequent stage sequentially by shifting a predetermined time. The coordinate data (x, y) can be generated in the imaging device 110 and sequentially given to the subsequent stage.

An analog-to-digital (A/D) converter 120 converts the Bayer-arrayed RGB pixel data, which is an analog signal output from the imaging device 110, into a digital signal and outputs the digital signal to a Bayer compensating unit 130. In the present embodiment, it is assumed that the digital signal includes 8 bits for each of RGB. Generally, an AGC circuit is provided at a previous stage of the A/D converter 120; however, it is omitted here.

The Bayer compensating unit 130 receives the Bayer-arrayed RGB pixel data, which is converted into the digital signal, generates image data of entire coordinate positions by a linear interpolation, and outputs the pixel data to a magnification-chromatic-aberration correcting unit 140.

Figure 2B:
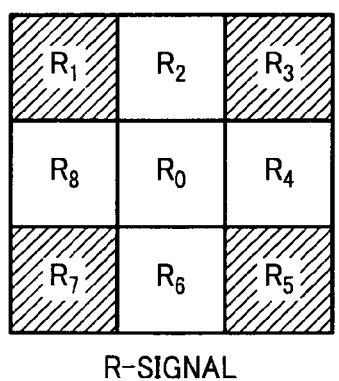
FIG. 2B is a schematic diagram of the Bayer color filter array for an R-signal.
Figure 2C:
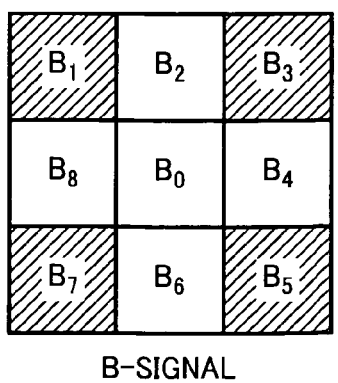
FIG. 2C is a schematic diagram of the Bayer color filter array for a B-signal.

FIGS. 2A to 2C are schematic diagrams of the Bayer color filter array, where $G_0$, $R_2$, $R_4$, $R_6$, $R_8$, and $R_0$ are obtained by Equations (1) to (6).

$$G_0 = (G_2 + G_4 + G_6 + G_8)/4 \quad (1)$$

$$R_2 = (R_1 + R_3)/2 \quad (2)$$

$$R_4 = (R_3 + R_5)/2 \quad (3)$$

$$R_6 = (R_5 + R_7)/2 \quad (4)$$

$$R_8 = (R_1 + R_7)/2 \quad (5)$$

$$R_0 = (R_1 + R_3 + R_5 + R_7)/4 \quad (6)$$

$B_2$, $B_4$, $B_6$, $B_8$, and $B_0$ are the same as the case of $R_2$, $R_4$, $R_6$, $R_8$, and $R_0$.

Although the embodiment deals with an imaging device employing the Bayer color filter array, the effect can be obtained for an imaging device employing other type of color filter array of CMYG array or RGB+Ir (infrared). Particularly, the imaging device having a color filter array of four colors requires a low latency memory or a 4-port RAM, expecting a high effect, compared to a three color type such as RGB.

The magnification-chromatic-aberration correcting unit 140 receives Bayer-compensated RGB pixel data, performs coordinate transformation (chromatic aberration of magnification coordinate transformation) individually with respect to the color components of RGB according to a predetermined equation, and outputs the chromatic aberration of magnification-corrected RGB pixel data. The magnification-chromatic-aberration correcting unit 140 will be described later together with a distortion correcting unit 160. However, a low-capacity and low-latency memory or a low-capacity memory having a plurality of ports (such as an SRAM) can be used for the coordinate transformation for correction of the chromatic aberration of magnification.

A modulation-transfer-function (MTF) correcting unit 150 receives the chromatic aberration of magnification-corrected RGB pixel data, performs MTF correction using an FIR file, and outputs the MTF-corrected RGB pixel data.

Figures 3, 4:
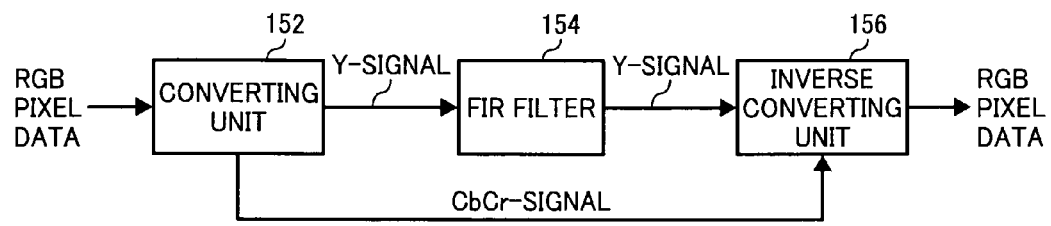
FIG. 3 is a block diagram of an MTF correcting unit according to the embodiment.
FIG. 4 is a schematic diagram for illustrating an example of an FIR filter.

FIG. 3 is a block diagram of the MTF correcting unit 150. A converting unit 152 converts RGB image data into YCbCr image data based on Equations (7) to (9).

$$Y = 0.299R + 0.587G + 0.114B \quad (7)$$

$$Cr = 0.500R - 0.419G - 0.081B \quad (8)$$

$$Cb = -0.169R - 0.332G + 0.500B \quad (9)$$

An FIR filter (5×5 filter) 154 receives only a luminance signal Y of YCbCr, and performs predetermined MTF correction. A high quality image with amplification of color noise being suppressed can be obtained by filtering (performing MTF correction) only to the Y-signal. FIG. 4 is a schematic diagram for illustrating an example of the FIR filter. Because the Y-signal is filtered, the MTF correction needs to be performed after the correction of the chromatic aberration of magnification. However, when the MTF correction is performed after the distortion correction, the transformation distance in the coordinate transformation is large in the distortion correction and an arithmetic error easily occurs, as described below. The MTF correction is preferably performed at a subsequent stage of correction of the chromatic aberration of magnification and at a previous stage of the distortion correction as in the present embodiment, to avoid that the error is amplified by the MTF correction to adversely affect the image quality.

An inverse converting unit 156 receives the CbCr-signal and the MTF-corrected Y-signal, and outputs inverse-converted RGB image data based on Equations (10) to (12).

$$R = Y + 1.402Cr \qquad (10)$$

$$G = Y - 0.714Cr - 0.344Cb \qquad (11)$$

$$B = Y + 1.772Cb \qquad (12)$$

The distortion correcting unit 160 receives the chromatic aberration of magnification-corrected and MTF-corrected RGB pixel data, performs the coordinate transformation (distortion coordinate transformation) commonly to the respective color components of RGB according to a predetermined equation, and outputs the distortion-corrected RGB pixel data. In the present invention, a small size circuit can be used for coordinate transformation in the distortion correcting unit 160, and a buffer memory for one line at most can be used as the memory. As described above, the distortion correcting unit 160 will be described in detail.

A gamma correcting unit 170 receives the RGB pixel data output from the distortion correcting unit 160, performs predetermined gamma correction by using respective lookup tables or the like of RGB, and outputs the gamma-corrected RGB pixel data.

The overall operation in the present embodiment shown in FIG. 1 is as explained above. The magnification-chromatic-aberration correcting unit 140 and the distortion correcting unit 160, which are major components in the present embodiment are described below in detail.

Figure 5:
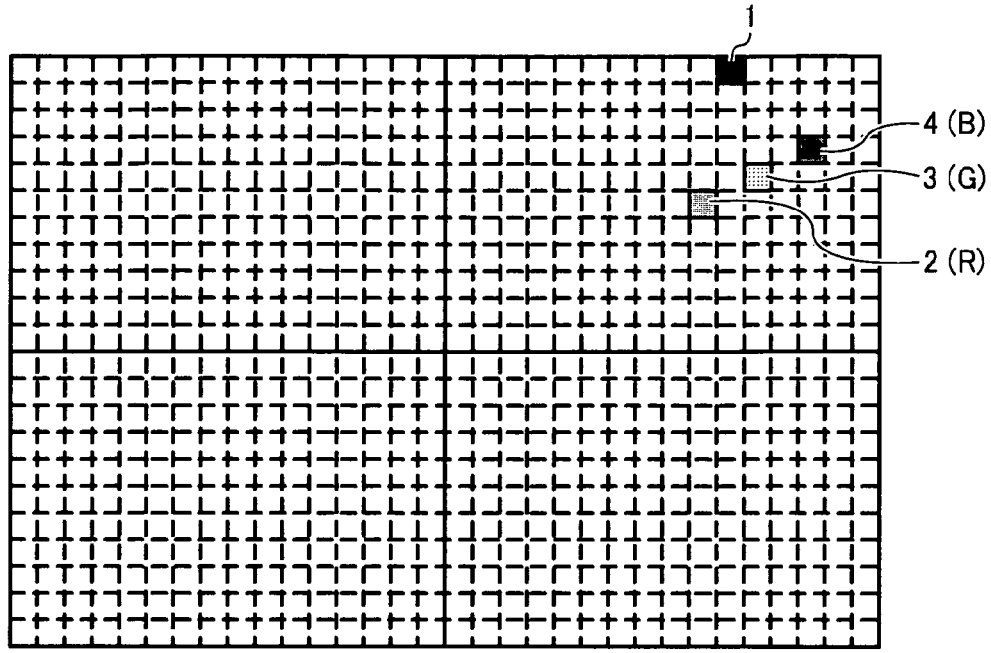
FIG. 5 is a schematic diagram for explaining chromatic aberration of magnification and distortion.

The principle of correction of the chromatic aberration of magnification and the distortion is explained first. As schematically shown in FIG. 5, when imaging is performed by using the optical system having the chromatic aberration of magnification and the distortion, the pixel data at a position (pixel) indicated by 1 on the upper right on a screen deviates from an original position due to the distortion, and also deviates differently for the color components of RGB due to the chromatic aberration of magnification. Therefore, the positions actually captured by the imaging device become at positions of 2(R), 3(G), and 4(B) for RGB. The correction of the chromatic aberration of magnification and the distortion is performed by copying the pixel data of respective color components of RGB at the positions (pixels) 2(R), 3(G), and 4(B) to the position (pixel) 1 as the original position, that is, by coordinate transformation. The positions 2, 3, and 4 are coordinates of a source, and position 1 is a coordinate of the destination.

Because the size of the distortion and the size of the chromatic aberration of magnification can be found according to statistical data of the optical system, it can be calculated to which position the respective color components of RGB deviate with respect to the original position.

Figure 6:
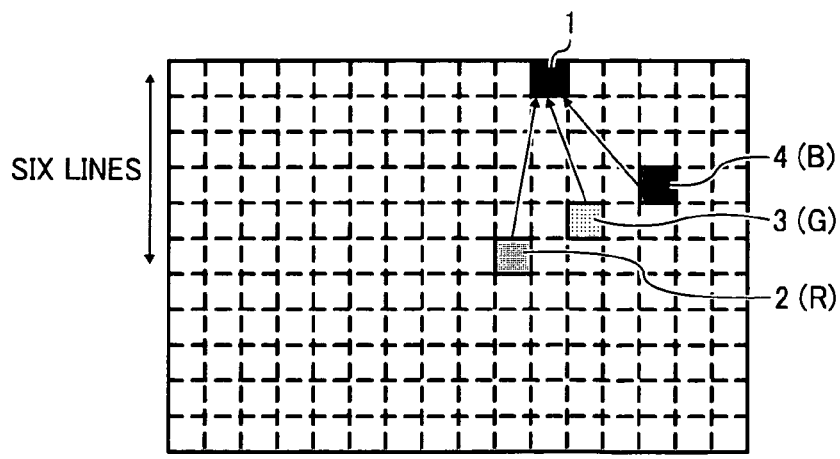
FIG. 6 is a schematic diagram for explaining of a general method of correcting chromatic aberration of magnification and distortion.

FIG. 6 is a schematic diagram of a general method of correcting the chromatic aberration of magnification and the distortion. That is, the pixel data of respective color components of RGB at the positions (pixels) 2(R), 3(G), and 4(B) are normally copied to the position (pixel) 1, which is the original position. That is, the chromatic aberration of magnification and the distortion are simultaneously corrected by the coordinate transformation. However, according to this method, a memory having a large capacity for each color component of RGB and a low latency or a multiport memory is required. For example, in the case of FIG. 6, a high-speed memory having six lines is required for the coordinate transformation for each color of RGB.

Figure 7A:
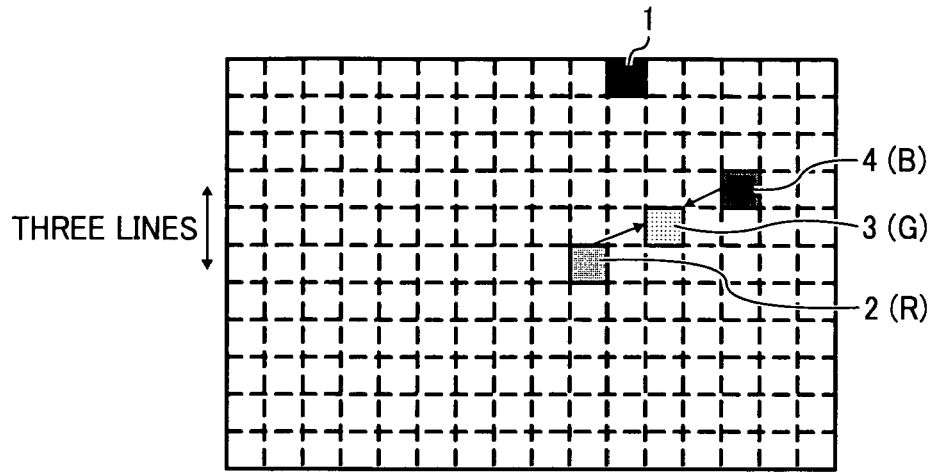
FIGS. 7A and 7B are schematic diagrams for explaining a method of correcting chromatic aberration of magnification and distortion according to the present invention.
Figure 7B:
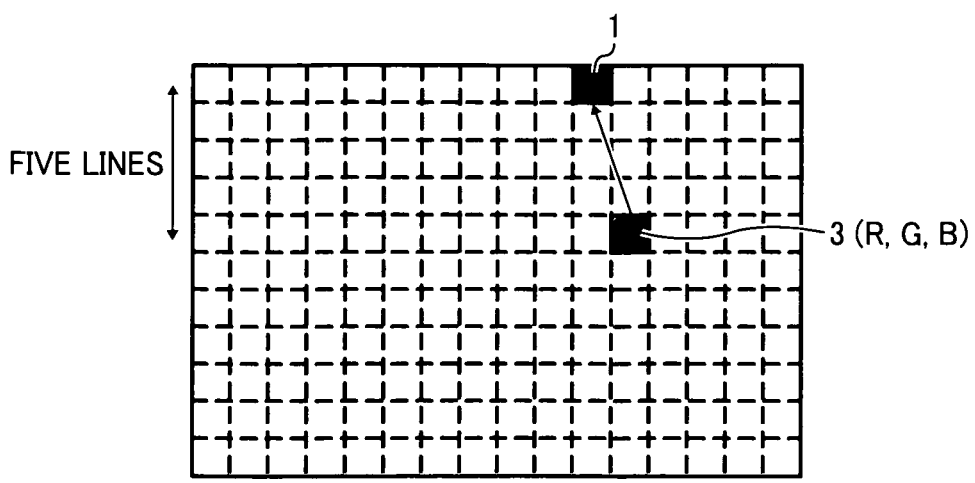

FIGS. 7A and 7B are schematic diagrams of a method of individually correcting the chromatic aberration of magnification and the distortion. The chromatic aberration of magnification is different for each color component; however, its deviation is small. On the other hand, although the deviation of the distortion is large, it is the same for each color component. Focusing on this, the chromatic aberration of magnification is corrected by respectively performing coordinate transformation with respect to the pixel data of respective color components of RGB (coordinate-transforming color components of RB and copying the color components to the position of G component), and thereafter, the chromatic aberration of magnification-corrected RGB pixel data are coordinate transformed collectively to correct the distortion. Accordingly, the memory for coordinate transformation can be divided into a small-capacity and high-speed (low-latency or multiport) RGB-compliant memory required for correction of the chromatic aberration of magnification, and a large-capacity and low-speed (high-latency or single-port) memory common to RGB required for correction of the distortion, thereby enabling to reduce the cost as a whole. The present invention is to realize further cost reduction as a whole by simplifying the formula of coordinate transformation specifically for correction of the chromatic aberration of magnification, and performing correction of the chromatic aberration of magnification with a simple and small circuit.

In FIG. 7A, coordinate transformation is performed with respect to the pixel data of the color components of RB at the positions (pixels) 2(R) and 4(B) to copy the data to the position (pixel) 3(G) of G component. The chromatic aberration of magnification is corrected by this operation. In FIG. 7B, coordinate transformation is performed collectively with respect to the chromatic aberration of magnification-corrected pixel data of the color components of RGB at the position (pixel) 3 to copy the data to the position (pixel) 1, which is the original position. The distortion is corrected by this operation.

In the examples shown in FIGS. 7A and 7B, an RGB-compliant three-line memory is sufficient for the high speed memory for correction of the chromatic aberration of magnification. A five-line memory is required separately for correction of the distortion; however, a low-speed memory can be used common to RGB, and cost reduction as a whole can be realized as compared with the case of FIG. 6. Further cost reduction can be realized as a whole by performing correction of the chromatic aberration of magnification and distortion with a simple and small circuit.

As described later, in the present invention, the formula of coordinate transformation particularly for correcting the distortion is simplified so that the distortion is corrected with a simple or small circuit, the coordinate transformation is performed only in the x direction, and the memory is required only for one line at most, thereby realizing cost reduction close to the utmost limits as a whole. In the present embodiment, the formula of coordinate transformation for correcting the magnification chromatic aberration is also simplified, so that the magnification chromatic aberration is corrected with the smallest circuit size. However, correction of the magnification chromatic aberration is not limited thereto (and can be omitted according to circumstances).

The distortion refers to a distortion of a lens with respect to an intended projection method, and for example, the intended projection method includes a projection method in which an image as looked down from above a camera is obtained, or a projection method in which a certain part is enlarged and displayed.

Figure 8:
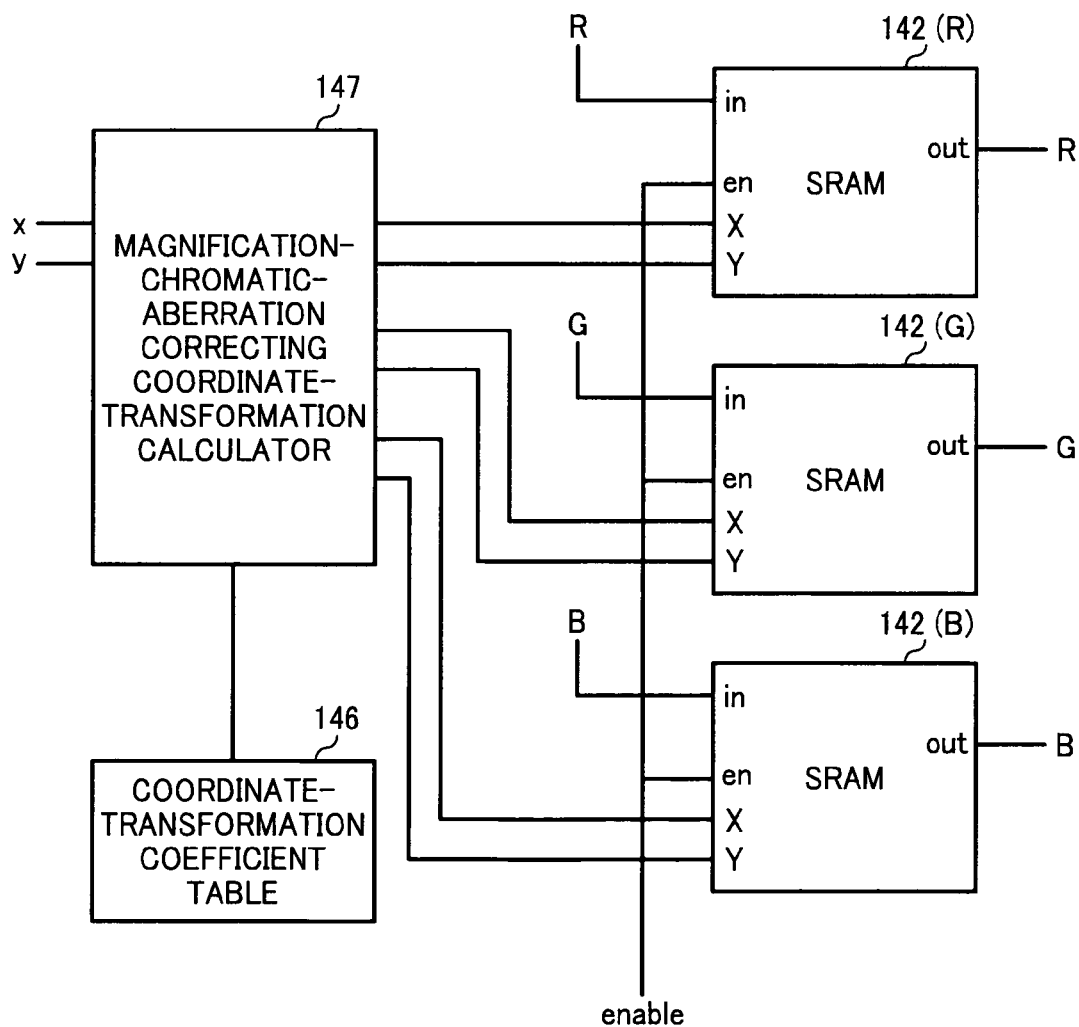
FIG. 8 is a configuration diagram of a magnification-chromatic-aberration correcting unit according to the embodiment.

FIG. 8 is a configuration diagram of the magnification-chromatic-aberration correcting unit 140 according to the present embodiment. In the present invention, the following equations are used as the formula of coordinate transformation for correction of the chromatic aberration of magnification (correction formula of the chromatic aberration of magnification).

$$\begin{cases} X = x + ax \\ Y = y + by \end{cases} \quad (13)$$

where x and y indicate a coordinate (original coordinate) of the destination when the center of screen is designated as an origin, X and Y indicate a coordinate of the source, and a and b are coordinate transformation coefficients. Pixel shift amounts Δx and Δy (correction amount) in x and y directions are expressed by Δx=ax and Δy=by. It has been confirmed that the same correction effect as that at the time of using a polynomial or the like can be obtained even if the formula of chromatic aberration of magnification is simplified to Equation (13) instead of a complicated polynomial or the like. Specifically, in the case of the fisheye optical system having large chromatic aberration of magnification, high number of bits is required due to the problem of calculation accuracy and a large-scale circuit is required. However, according to the present method, because multiplication is required only one with respect to each of the x and y axes, there is a large reduction effect of the circuit size. Particularly, because the analog multiplier used here needs only to perform multiplication of "constant×variable", a small-scale analog multiplier can be used, and a large-scale analog multiplier of "variable× variable" for calculating a square term, which has been required in the method disclosed in "Recent Trend of Camera Calibration Method" or the like is not required.

In FIG. 8, reference numeral 142 denotes a coordinate transformation memory (line buffer) for correcting the chromatic aberration of magnification, and 142(R), 142(G), and 142(B) respectively correspond to the color components of RGB. Reference numeral 144 denotes a chromatic aberration of magnification correcting coordinate-transformation calculator that calculates the transformation coordinate for correcting the chromatic aberration of magnification for each of RGB according to the formula of coordinate transformation of Equation (13), and 146 denotes a coordinate-transformation coefficient table that holds coefficients a and b used in the formula of coordinate transformation.

For the correction of the chromatic aberration of magnification, a small-capacity three-port memory for RGB or a low-latency memory is required as the line buffer. It is assumed here that the coordinate transformation memories 142(R), 142(G), and 142(B) respectively include an SRAM for 20 lines, assuming that the largest deviation amount of the chromatic aberration of magnification is 20 lines in the y direction. The size in the x direction is determined by resolution. For example, in the case of resolution VGA (640× 480), the size in the x direction is 640 dots. The color depth is RGB 8 bits, and writing and reading with respect to the coordinate transformation memories 142(R), 142(G), and 142(B) are performed in a unit of 8 bits.

Thus, because the coordinate transformation memories (line buffers) 142(R), 142(G), and 142(B) for correcting the chromatic aberration of magnification have small capacity, it is desired to ensure a memory area for 20 lines, respectively, by using the three-port SRAM prepared in an image processing chip of the imaging apparatus. In the case of the low-latency memory such as the SRAM, a one-port memory can be used as the three-port memory by time sharing.

The respective pixel data of RGB of the captured image having the chromatic aberration of magnification and the distortion are sequentially written in the coordinate transformation memories 142(R), 142(G), and 142(B), respectively, from the top line according to the coordinate data (x, y). When the pixel data for 20 lines are respectively written, the pixel data is sequentially discarded from the top line, and the pixel data of the subsequent line is newly written. In the coordinate transformation memories 142(R), 142(G), and 142(B), the RGB pixel data up to 20 lines, respectively, required for the coordinate transformation for correcting the chromatic aberration of magnification are sequentially stored.

The coordinate data (x, y) indicates a read position of the captured image for one frame. On the other hand, because the coordinate transformation memories 142(R), 142(G), and 142(B) are line buffers for 20 lines and a write line is cyclically changed, the coordinate data (x, y) cannot be used directly as a write address of the coordinate transformation memories 142(R), 142(G), and 142(B). Accordingly, the value of the coordinate data (x, y) needs to be changed to a real address of the coordinate transformation memories 142(R), 142(G), and 142(B); however, a configuration for the conversion is omitted in FIG. 8. Same thing applies to a relation between the coordinate data (X, Y) after the conversion in a read operation described later and a read address of the coordinate transformation memories 142(R), 142(G), and 142(B).

The chromatic aberration of magnification correcting coordinate-transformation calculator 144 calculates the transformation coordinate for correcting the chromatic aberration of magnification for each of RGB according to the formula of coordinate transformation of Equation (13), designating the coordinate data (x, y) of the destination as an input, and outputs the coordinate data (X, Y), which is the source of each of RGB. As shown in FIG. 7A, in the present embodiment, the color components of RB are coordinate-transformed and copied to the position of the G component. Therefore, the chromatic aberration of magnification correcting coordinate-transformation calculator 144 outputs the input coordinate data (X, Y) directly as the coordinate data (X, Y) for the G component, and transforms the coordinate data (x, y) respectively input by using the formula of coordinate transformation of Equation (13) to the coordinate data (X, Y) for the RB components, and outputs the coordinate data (X, Y). This operation is repeated for each coordinate data (x, y).

The coordinate transformation memories 142(R), 142(G), and 142(B) sequentially reads the RGB pixel data, respectively, based on the coordinate data (X, Y) output from the chromatic aberration of magnification correcting coordinate-transformation calculator 144 (in practice, based on a value obtained by transforming an address of the coordinate data (X, Y)) in parallel with the previous write operation (in practice, delayed by a predetermined time). The G component pixel data at the same position as that at the time of write is read from the coordinate transformation memory 142(G). On the other hand, the RB component pixel data deviated by predetermined positions from that at the time of write (Δx, Δy), that is, deviated for a portion of chromatic aberration of magnification is read from the coordinate transformation memories 142(R) and 142(B).

By performing the above processing, the chromatic aberration of magnification-corrected RGB pixel data is respectively output from the coordinate transformation memories 142(R), 142(G), and 142(B).

Figure 9A:
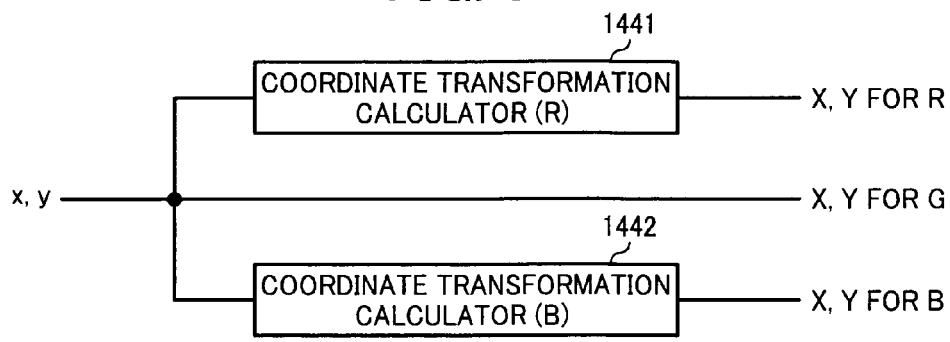
FIGS. 9A to 9C are examples of a chromatic aberration of magnification correcting coordinate-transformation calculator.
Figure 9B:
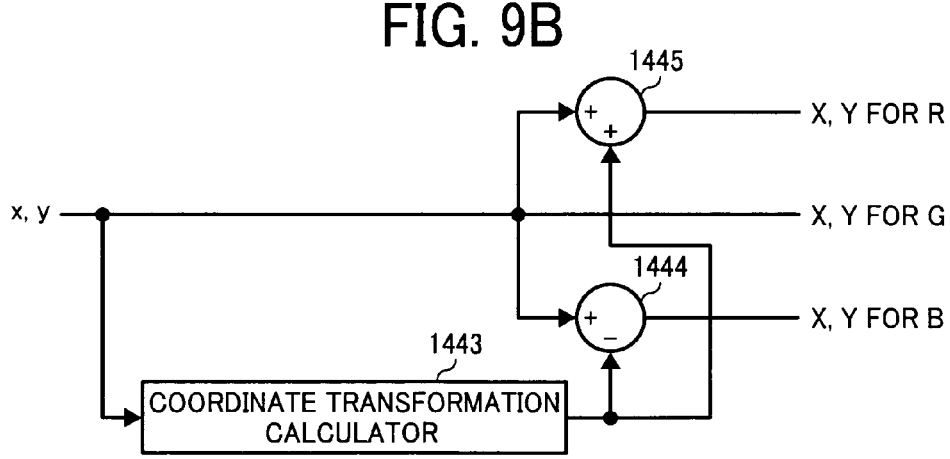
Figure 9C:
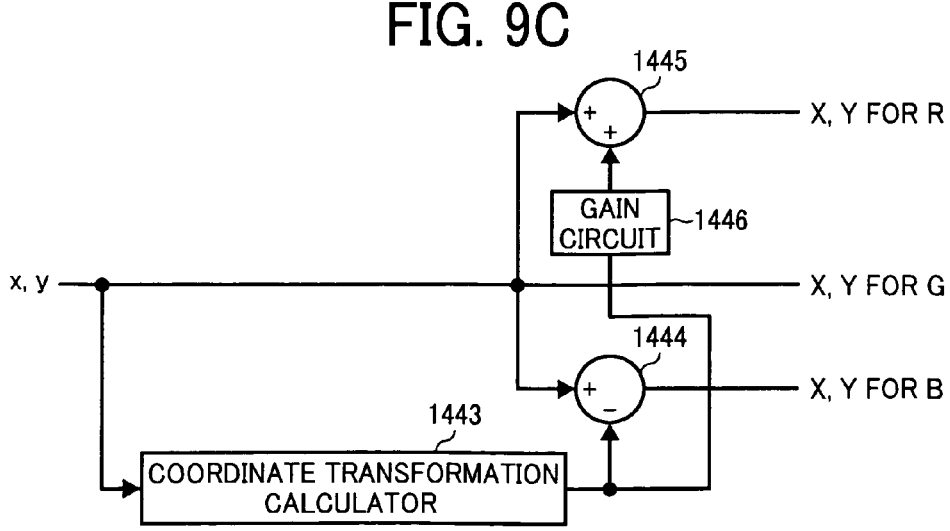

FIGS. 9A to 9C are three specific examples of the chromatic aberration of magnification correcting coordinate-transformation calculator 144. FIG. 9A is an example in which coordinate transformation is not performed for the color component of G, and the input coordinate data (x, y) is directly output as the coordinate data (X, Y) for G, whereas coordinate transformation is performed only for the input coordinate data (x, y) of the color components of R and B, respectively, by coordinate transformation calculators 1441 and 1442 by using Equation (13), and the coordinate data (X, Y) for R and the coordinate data (X, Y) for B are output. The circuit size of the coordinate transformation calculators can be reduced, because Equation (13) has a simple structure, and further, the coordinate transformation needs only to be performed only for the color components of R and B, thereby enabling to further reduce the circuit size.

FIGS. 9B and 9C focus on a fact that the chromatic aberration of magnification generally occurs because the color components of R and B are shifted substantially symmetrically, with respect to G (see FIG. 5). FIG. 9B is an example in which a coordinate transformation calculator 1443 obtains a correction amount (Δx and Δy) for the coordinate data (x, y), and a value obtained by subtracting the correction amount from the coordinate data (x, y) by a subtracter 1444 is designated as the coordinate data (X, Y) for B, whereas a value obtained by adding the correction amount to the coordinate data (x, y) by an adder 1445 is designated as the coordinate data (X, Y) for R. As in FIG. 9A, the coordinate data (x, y) is directly output for the coordinate data (X, Y) for G.

FIG. 9C is an example in which the correction amount for R is adjusted by a gain circuit 1446, taking into consideration the shift at symmetrical positions. The gain circuit can be provided on the B side. According to the examples shown in FIGS. 9B and 9C, the coordinate transformation calculator can be only one, thereby enabling to further reduce the circuit size.

Instead of the coordinate transformation calculators 1441 and 1442 in FIG. 9A, a lookup table (LUT) storing correspondence between the input coordinate data (x, y) and the output coordinate data (X, Y) can be prepared, so that the coordinate data (X, Y) of the source with respect to the coordinate data (x, y) of the destination can be directly obtained by using the LUT. Likewise, instead of the coordinate transformation calculator 1443 in FIGS. 9B and 9C, a lookup table storing correspondence between the input coordinate data (x, y) and the correction amount can be prepared, so that the correction amount corresponding to the coordinate data (x, y) can be directly obtained by using the LUT. Accordingly, calculation for the coordinate transformation can be omitted, and correction of the chromatic aberration of magnification can be basically realized only by a memory chip.

Figure 10:
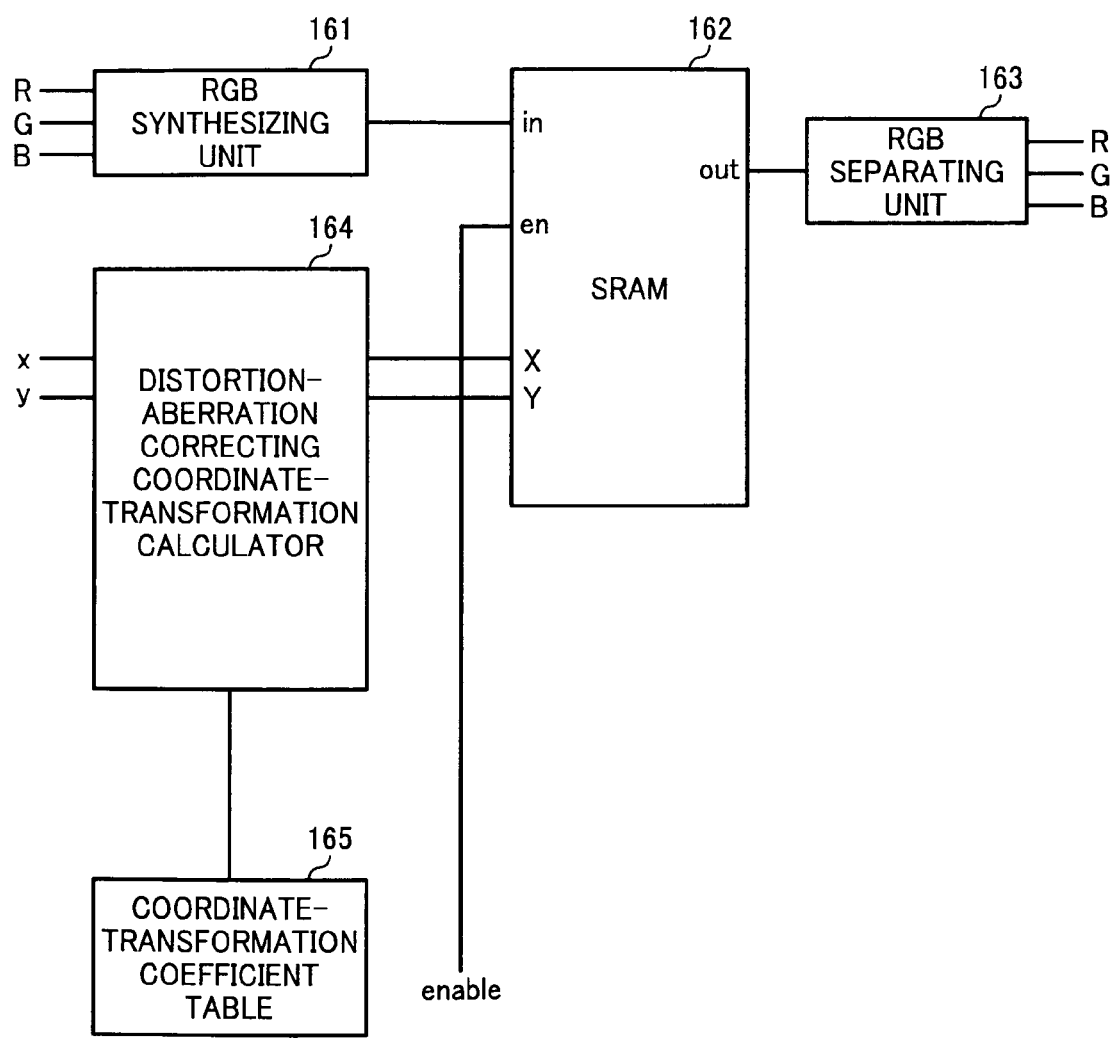
FIG. 10 is a configuration diagram of a distortion correcting unit according to the embodiment.

FIG. 10 is a configuration diagram of the distortion correcting unit 160. According to the embodiment, the following equation is used as the formula of coordinate transformation (distortion correction formula) for correcting the distortion.

$$\begin{cases} X = x + (a + by^2)x \\ Y = y \end{cases} \quad (14)$$

where x and y indicate a coordinate (original coordinate) of the destination when the center of screen is designated as an origin, X and Y indicate a coordinate of the source, and a and b are coordinate transformation coefficients. A pixel shift amount Δx (correction amount) in the x direction is expressed by $\Delta x=(a+by^2)x$. An image having a large distortion can be corrected to an image easily viewable to human eyes even by coordinate transformation only in the x direction according to a simple transformation formula as the equation (14), which does not use a trigonometric function or a high-order polynomial. Particularly, even the fisheye image having the large distortion obtained by using the fisheye optical system, which has conventionally required a large-scale circuit, can be corrected to an image easily viewable to human eyes by using a small circuit. Further, because the pixel shift is only in the x direction, a memory that stores the past image data needs only to be for one line at most for correction of the distortion, and a memory size required can be considerably reduced. Of course, there is no problem in having a large memory size.

Further, by replacing x and y in the equation (14) by x' and y', only left and right portions can be cut out from the fisheye image and displayed in an enlarged scale.

$x'=k+(xsize-k)/xsize*x$ (when $x>0$); and $y'=-k+(xsize-k)/xsize*x$ (when $x\leq 0$), where xsize is the number of pixels divided by 2 in a horizontal direction of the image, and k is a magnification coefficient ($0\leq k\leq xsize$). As k becomes larger, a magnification percentage of the left and right portion increases.

By using this enlarged display method of the left and right portions, an image easy to confirm the left and right can be formed at a T intersection or a crossroad, from an image of a camera installed, for example, at the front of a vehicle. A user can select by a switch whether to use the enlarged display method of the left and right portions, and for example, can switch when the vehicle speed becomes below certain speed or when shift change is made to a reverse position.

In FIG. 10, reference numeral 161 denotes an RGB synthesizing unit that synthesizes three pixel data of RGB into one pixel data, 162 denotes a coordinate transformation memory for correcting the distortion common to the RGB pixel data, 163 denotes an RGB separating unit that separates the RGB pixel data to original color components, 164 denotes a distortion correcting coordinate-transformation calculator that calculates the transformation coordinate for correcting the distortion according to the formula of coordinate transformation of Equation (14) with respect to the synthesized RGB pixel data, and 165 denotes a coordinate-transformation coefficient table that holds coefficients a and b used in the formula of coordinate transformation.

The RGB synthesizing unit 161 sequentially receives respective chromatic aberration of magnification-corrected RGB pixel data (8 bits, respectively), synthesizes these data into one pixel data (24 bits), and outputs the synthesized pixel data. The synthesized RGB pixel data is sequentially written in the coordinate transformation memory 162 from a top line according to the respective coordinate data (x, y).

On the other hand, the distortion correcting coordinate-transformation calculator 164 calculates the transformation coordinate for correction of the distortion common to RGB according to the formula of coordinate transformation of Equation (14), designating the coordinate data (x, y) as an input, and outputs the transformed coordinate data (X, Y). Specifically, the distortion correcting coordinate-transformation calculator 164 calculates the transformation coordinate in the x direction according to Equation (14), and outputs the transformed coordinate data (X, Y), leaving the y direction as it is. The coordinate transformation coefficients used for calculation in Equation (14) is held in the coordinate-transformation coefficient table 165 beforehand. Because Equation (14) is used for the formula of coordinate transformation for correcting the distortion, the circuit size of the distortion correcting coordinate-transformation calculator 164 can be reduced.

The coordinate transformation memory 162 sequentially reads the RGB synthesized pixel data based on the coordinate data (X, Y) output from the distortion correcting coordinate-transformation calculator 164, in parallel with (in practice, delayed by a predetermined time from) the write operation of the previous RGB synthesized pixel data (24 bits). The RGB separating unit 163 separates the RGB synthesized pixel data (24 bits) read from the coordinate transformation memory 162 into pixel data (8 bits) for respective color components of RGB. By using Equation (14), pixel shift is only in the x-direction. Therefore, the coordinate transformation memory 162 needs only to be for one line at most, thereby enabling to greatly reduce the required memory size.

According to the above processing, the RGB separating unit 163 outputs respective RGB pixel data with the chromatic aberration of magnification and distortion being corrected. That is, the respective RGB pixel data is copied to the original position (x, y).

Also in the distortion correction, the lookup table (LUT) storing correspondence between the input coordinate data (x, y) and the output coordinate data (X, Y) can be prepared, so that the transformed coordinate data (X, Y) with respect to the coordinate data (x, y) can be directly obtained by using the LUT. Accordingly, calculation for coordinate transformation can be omitted, and the distortion correction can be also realized basically only by a memory chip.

It has been confirmed that the fisheye image having a large distortion can be corrected to an image easily viewable to human eyes only by performing coordinate transformation only in the x direction according to the equation (14). According to the image processing method and the image processing apparatus of the present invention, correction of the distortion can be performed without degrading the performance, with the minimum circuit size. In addition, according to the imaging apparatus of the present invention, further cost reduction becomes possible. Further, by replacing x and y in the equation (14) by x' and y', only left and right portions can be cut out from the fisheye image and displayed in an enlarged scale.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of processing image data including a second-order distortion, the method comprising:
correcting the second-order distortion by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

2. The method according to claim 1, wherein x and y are replaced with x'=k+(xsize−k)/xsize*x (when x>0) and y'=−k+(xsize−k)/xsize*x (when x≦0), respectively, where xsize is a half of number of pixels in a lateral direction of the image, and k is a magnification coefficient (0≦k≦xsize).

3. An apparatus for processing image data including a second-order distortion, the apparatus comprising:
a distortion correcting circuit that corrects the second-order distortion by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

4. The apparatus according to claim 3, wherein x and y are replaced with x'=k+(xsize−k)/xsize*x (when x>0) and y'=−k+(xsize−k)/xsize*x (when x≦0), respectively, where xsize is a half of number of pixels in a lateral direction of the image, and k is a magnification coefficient (0≦k≦xsize).

5. An imaging apparatus comprising:
an imaging device that captures an image using an optical system having a large second-order distortion and outputs image data including the second-order distortion; and
an image processing apparatus that processes the image data including, wherein
the image processing apparatus includes
a distortion correcting unit circuit that corrects the second-order distortion by performing a coordinate transformation with respect to the image data based on $$\begin{cases} X = x + (a + by^2)x \\ Y = y \end{cases}$$

where x and y represents coordinates of a transformation destination with a center of a screen as an origin, X and Y represents coordinates of a transformation source with the center of the screen as an origin, and a and b are coordinate transformation coefficients.

6. The imaging apparatus according to claim 5, wherein the optical system is a fisheye optical system.

* * * * *